United States Patent
Wang

(10) Patent No.: US 11,774,385 B2
(45) Date of Patent: Oct. 3, 2023

(54) CONTACTLESS INSPECTION APPARATUS OF HEAT PIPE AND METHOD THEREOF

(71) Applicant: Delta Electronics, Inc., Taoyuan (TW)

(72) Inventor: Zhi-Sheng Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 149 days.

(21) Appl. No.: 17/410,981

(22) Filed: Aug. 24, 2021

(65) Prior Publication Data

US 2022/0334073 A1    Oct. 20, 2022

(30) Foreign Application Priority Data

Apr. 20, 2021 (CN) .......................... 202110424876.9

(51) Int. Cl.
 *G01N 25/72* (2006.01)
 *G01J 5/00* (2022.01)

(52) U.S. Cl.
 CPC ............... *G01N 25/72* (2013.01); *G01J 5/00* (2013.01)

(58) Field of Classification Search
 CPC ..................................................... G01N 25/72
 USPC ..................................................... 374/5, 121
 See application file for complete search history.

(56) References Cited

U.S. PATENT DOCUMENTS

2010/0046574 A1    2/2010  Hamann et al.

FOREIGN PATENT DOCUMENTS

| CN | 213956088 U | * | 8/2021 | |
|---|---|---|---|---|
| JP | 2000230914 A | * | 8/2000 | |
| RU | 2680178 C1 | * | 2/2019 | ............ F28D 15/02 |
| RU | 2685804 C1 | * | 4/2019 | ............ F28D 15/02 |
| TW | 200628785 A | | 8/2006 | |
| TW | 201925768 A | | 7/2019 | |

OTHER PUBLICATIONS

Office Action dated Apr. 6, 2022 of the corresponding Taiwan patent application No. 110114098.

* cited by examiner

*Primary Examiner* — Mirellys Jagan
(74) *Attorney, Agent, or Firm* — Chun-Ming Shih; HDLS IPR SERVICES

(57) ABSTRACT

A contactless inspection apparatus of a heat pipe and a method thereof are provided. The disclosure controls an infrared heating module to heat a heat pipe to be inspected based on a heating parameter, and controls an infrared temperature measurement module to collect a measurement temperature data of the heat pipe. The disclosure monitors a temperature slope of the measurement temperature data during a heating procedure, calculates a score based on the temperature slope when the temperature slope is converged to a stop slope, and determines a quality of the heat pipe based on the score. The disclosure may inspect a conductive quality of the heat pipe.

20 Claims, 9 Drawing Sheets

CONTACTLESS INSPECTION APPARATUS OF HEAT PIPE AND METHOD THEREOF

BACKGROUND

Technical Field

The technical field relates to an inspection of a heat pipe, and more particularly relates to a contactless inspection of the heat pipe.

Description of Related Art

Currently, most of the inspections of heat pipes adopts the contact inspection method. More specifically, the contact inspection method is to firstly heat a thermal block to achieve a fixed temperature, and move the heated thermal block to contact a heat pipe to heat the heat pipe by thermal conduction until the temperature of the heat pipe reaches a thermal equilibrium. Then, a contact temperature sensor is used to contact two positions of the heat pipe to measure temperatures of the two positions, and a conduction effect of the heat pipe may be determined as good or bad based on a temperature difference between the temperatures of the two positions.

Some disadvantages of the contact inspection method are discussed below.

1. The inspection time of the contact inspection method is greatly increased because it needs to heat the thermal block to achieve the fixed temperature and wait for the temperature of the heat pipe to become stable.

2. The thermal energy of the thermal block is easy to lose, and the heating power may be provided differently due to different contact force or contact area between the thermal block and the heat pipe contacted therewith, so the contact inspection method fails to provide stable heating power to the heat pipe.

3. In general, the temperature of the contact temperature sensor is less than the temperature of the heated heat pipe, such that a measurement error is generated by the above temperature difference when the contact temperature sensor contacts the heat pipe. Besides, the thermal resistance is influenced by the contact strength, and the measurement result is influenced by the thermal resistance.

4. the temperature difference between the two positions of the heat pipe is changed with different heating powers, such that the inspection result can't be used to determine the conduction effect.

Thus, the contact inspection method in the related art has the above-mentioned problems, there is a need for a more effective solution.

SUMMARY

The disclosure is direct to a contactless inspection apparatus and method using a contactless heating procedure and a contactless temperature measurement heat pipe. Besides, in the present disclosure, the inspection may be completed even if the temperature of the heat pipe is unstable.

In one of the exemplary embodiments, the disclosure discloses a contactless inspection method of a heat pipe applied to a contactless inspection apparatus including an infrared heating module and an infrared temperature measurement module, the method includes: a) retrieving a heating parameter and an object information of the heat pipe to be inspected; b) calculating a stop slope based on an infrared heating parameter of the infrared heating module and an object thermal parameter to heat the heat pipe; c) controlling the infrared heating module to heat the heat pipe to be inspected based on the heating parameter, and controlling the infrared temperature measurement module to measure a measurement temperature data of the heat pipe to be inspected; d) monitoring a temperature slope of the measurement temperature data during a heating procedure; e) executing a scoring process based on the temperature slope to determine a score of the heat pipe to be inspected when a stop condition is met, wherein the stop condition includes a condition of the temperature slope being converged to the stop slope; and, f) determining the heat pipe to be inspected to be a non-defective one when the score of the heat pipe to be inspected is greater than a score threshold, and determining the heat pipe to be inspected to be a defective one when the score of the heat pipe is less than the score threshold.

In one of the exemplary embodiments, the disclosure discloses a contactless inspection apparatus of a heat pipe, includes an infrared heating module, an infrared temperature measurement module, and a control module. The infrared heating module is configured to heat the heat pipe to be inspected based on a heating parameter; the infrared temperature measurement module is configured to measure a measurement temperature data of the heat pipe to be inspected; and, the control module is electrically connected to the infrared heating module and the infrared temperature measurement module, configured to retrieve a heating parameter and an object information of the heat pipe to be inspected, the control module is configured to calculate a stop slope based on an infrared heating parameter of the infrared heating module and an object thermal parameter to heat the heat pipe to be inspected, the control module is configured to monitor a temperature slope of the measurement temperature data during a heating procedure, and determine a score of the heat pipe based to be inspected on the temperature slope when a stop condition is met, the control module is configured to determine the heat pipe to be inspected to be a non-defective one when the score of the heat pipe is greater than a score threshold, and determine the heat pipe to be a defective one when the score of the heat pipe is less than the score threshold, wherein the stop condition includes a condition of the temperature slope being converged to the stop slope.

The disclosure may inspect a conductive quality of the heat pipe to be inspected.

BRIEF DESCRIPTION OF THE DRAWINGS

The features of the present disclosure are believed to be novel are set forth with particularity in the appended claims. The present disclosure itself, however, may be best understood by reference to the following detailed description of the present disclosure which describes an exemplary embodiment of the present disclosure, taken in conjunction with the accompanying drawings, in which:

DETAILED DESCRIPTION

The technical contents of this disclosure will become apparent with the detailed description of embodiments accompanied with the illustration of related drawings as follows.

It is intended that the embodiments and drawings disclosed herein are to be considered illustrative rather than restrictive.

The present disclosure discloses a contactless inspection apparatus and method that implement a contactless heating procedure and a contactless temperature-measuring procedure by using an infrared heating approach and an infrared temperature-measuring approach. The disclosure may provide a stable heating power and prevent a measurement error caused by temperature difference between a contact temperature sensor and a heat pipe to be inspected.

Moreover, by scoring a thermal conduction of the heat pipe to be inspected based on a slope of a temperature variation, the present disclosure may provide a high accuracy scoring, and may complete the inspection without waiting for the heat pipe to achieve a thermal equilibrium, so as to significantly reduce an inspection time.

Figure 1:
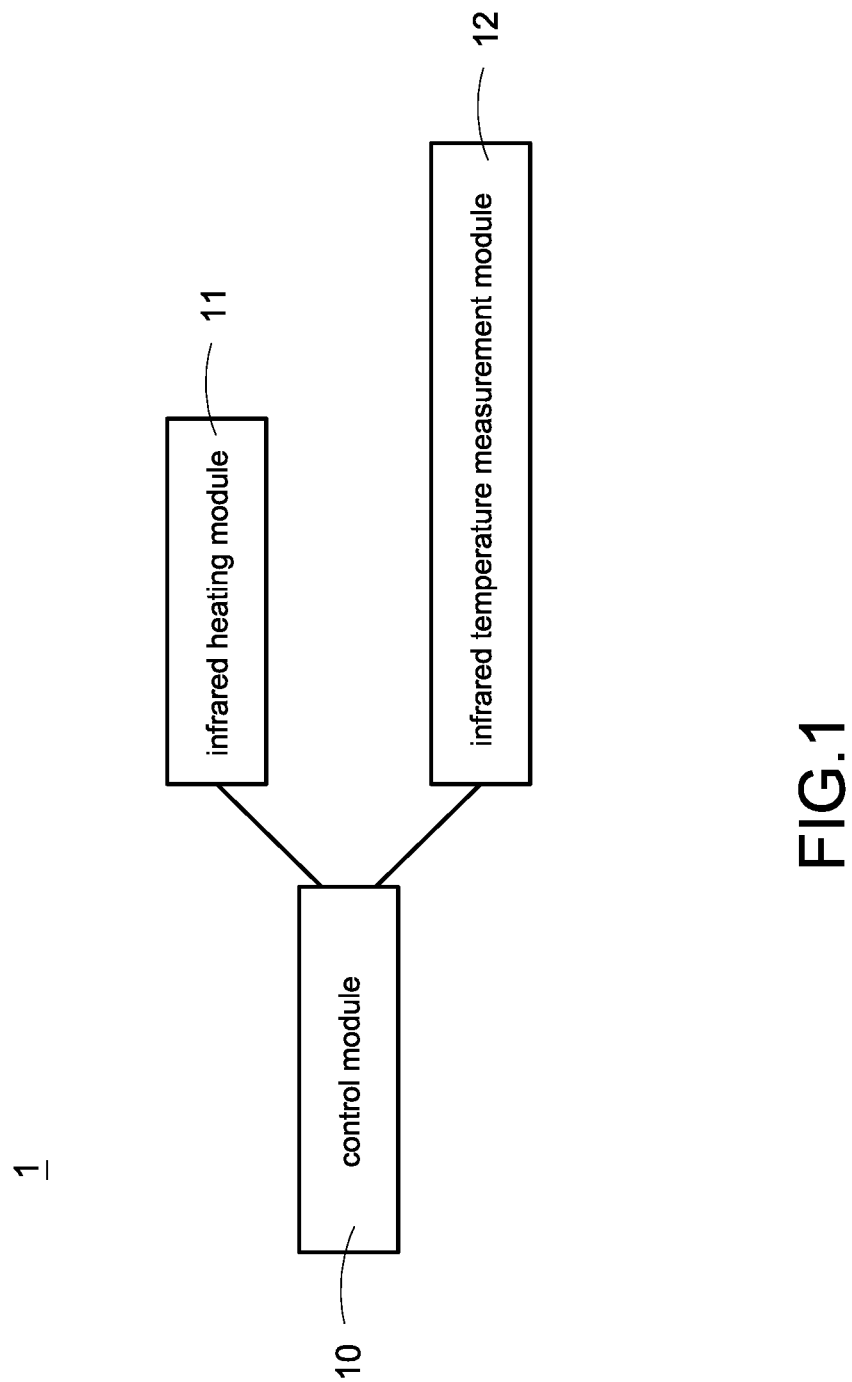
FIG. 1 is an architecture diagram of the contactless inspection apparatus according to an embodiment of the present disclosure.

Please refer to FIG. 1, which is an architecture diagram of the contactless inspection apparatus according to an embodiment of the present disclosure.

The contactless inspection apparatus 1 of this embodiment includes an infrared heating module 11, an infrared temperature measurement module 12, and a control module 10 electrically connected to the above modules.

The infrared heating module 11, such as a Halogen heater, a Short Wave InfraRed heater, a Fast Medium InfraRed Heater, a Carbon Medium InfraRed Heater, (Carbon dioxide) a Laser heater or other types of InfraRed heater, is used to heat the object(s) based on a configured heating parameter.

Please be noted that in comparison with a hot air blower that indirectly heats an object by convection of hot air with a lower heating efficiency, the infrared heating module 11 used in the present disclosure may provide a heating efficiency much better than the hot air blower by directly irradiating the heat pipe by infrared energy.

The infrared temperature measurement module 12, such as a single point infrared thermometer, a multi-point infrared thermometer, a laser thermometer, or other types of infrared thermometer, is used to continuously measure a surface temperature of the heat pipe.

The control module 10, such as a computer, a processor, a microcontroller, a control box, etc., is used to control the contactless inspection apparatus 1 to implement a contactless inspection procedure of the present disclosure.

Figure 2:
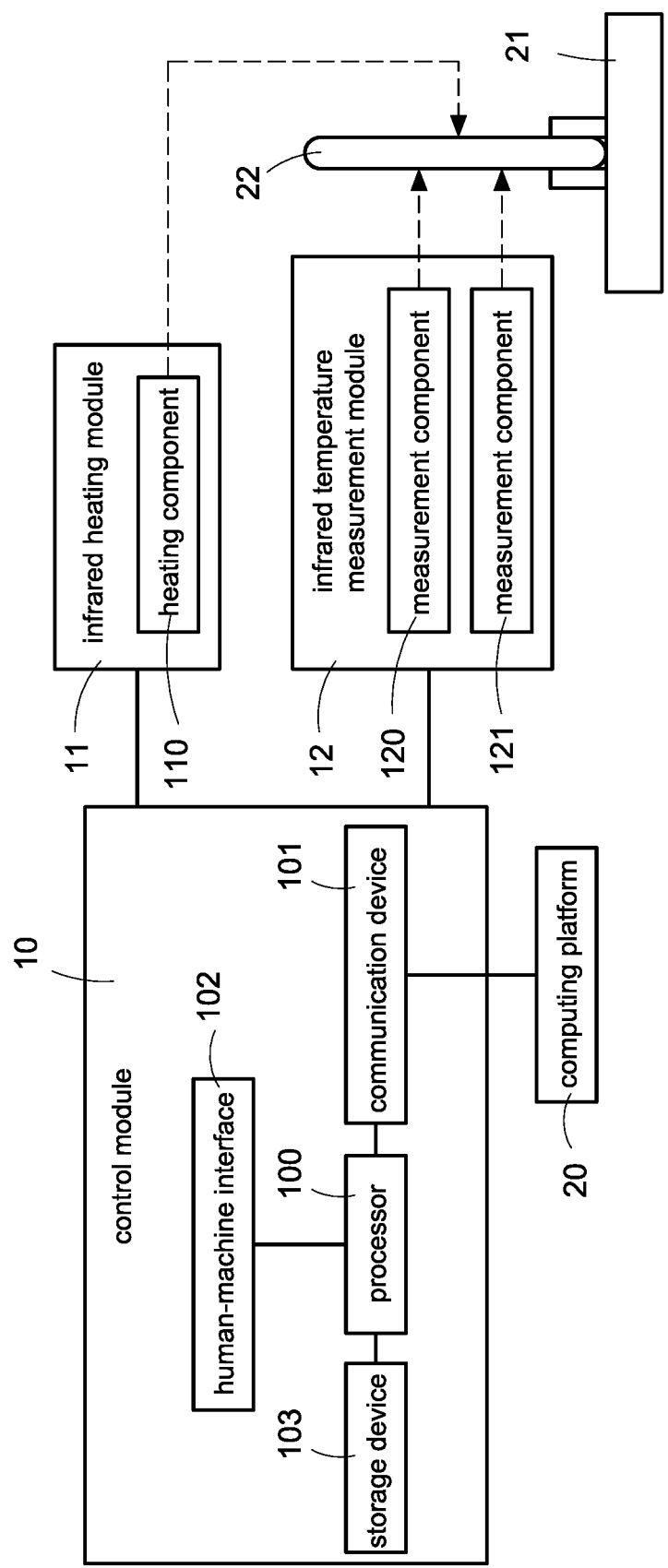
FIG. 2 is an architecture diagram of the contactless inspection apparatus according to an embodiment of the present disclosure.

Please refer to FIG. 2, which is an architecture diagram of the contactless inspection apparatus according to an embodiment of the present disclosure.

As shown in FIG. 2, the control module 10 may be a computer system, such as a personal computer, a tablet computer, a smartphone, a notebook computer, or other types of general-purpose computer system, and may be connected to the infrared heating module 11 and the infrared temperature measurement module 12 by a communication device 101.

The control module 10 may include the communication device 101, a human-machine interface 102, a storage device 103 and a processor 100, such as a CPU, electrically connected to the above devices.

The communication interface 101, such as any combination of a Network Interface Card (NIC), a Wi-Fi interface, a Bluetooth interface, an USB interface, an Ethernet interface, a ZigBee interface, an RS232 interface, and other types of communication interface, is used to connect to an external apparatus for communication.

The human-machine interface 102, such as any combination of input devices (such as keyboard, mouse, or touchpad), output devices (such as a display, a speaker, a buzzer, or an indicator), and I/O combination devices (such as a touch screen), is used to receive a user operation and output an information for the user.

The storage module 103, such as a hard disk drive, a solid state drive, a flash memory, a RAM, an EEPROM and other types of storage module, is used to store data.

The processor 100 is used to operate and control each device and module to implement the contactless inspection procedure of the present disclosure (described later).

Figure 3:
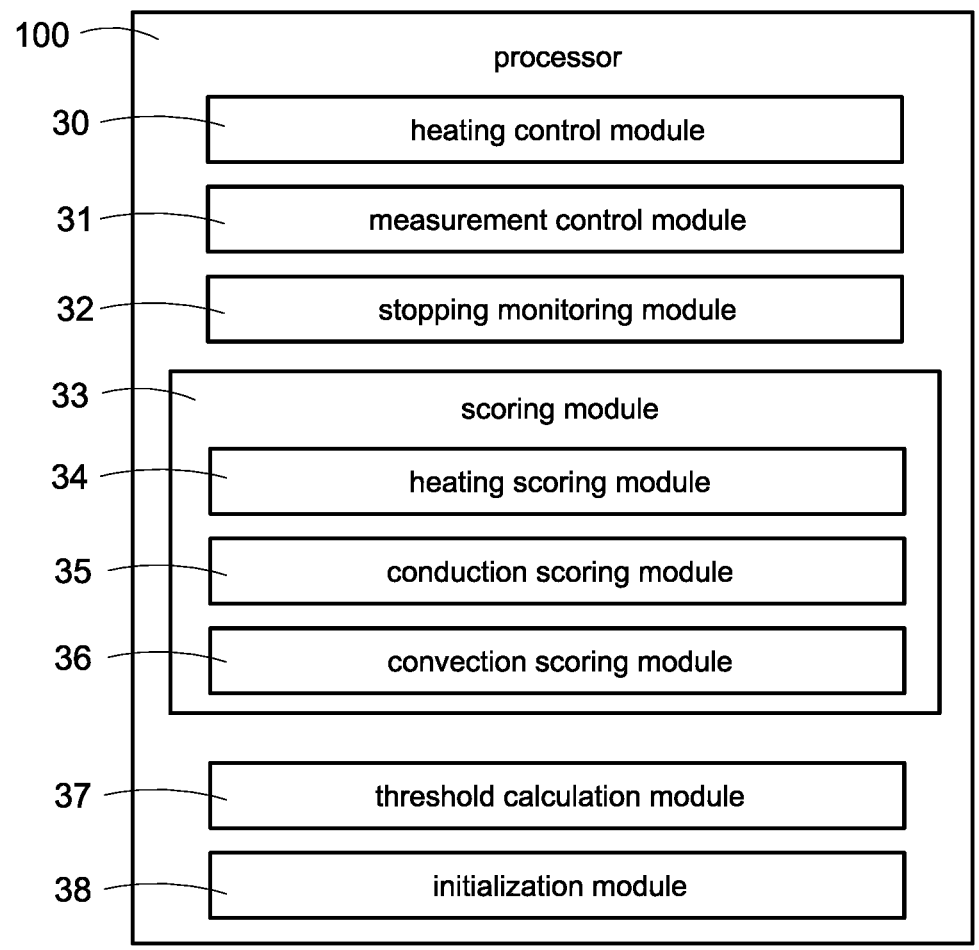
FIG. 3 is an architecture diagram of the processor according to an embodiment of the present disclosure.

Please refer to FIG. 3, which is an architecture diagram of the processor according to an embodiment of the present disclosure. The processor 100 of the present disclosure may include all or part of following modules 30-38, the modules 30-38 are used to implement different functions respectively.

1. A heating control module 30, is configured to control the infrared heating module 11.

2. A measurement control module 31, is configured to control the infrared temperature measurement module 12.

3. A stopping monitoring module 32, is configured to detect whether a default stop condition is met.

4. A scoring module 33, is configured to execute a scoring process to a current-completed inspection.

In one of the exemplary embodiments, the scoring module 33 may include a heating scoring module 34, a conduction scoring module 35, and a convection scoring module 36. The heating scoring module 34 is configured to score a heating status of the current-completed inspection. The conduction scoring module 35 is configured to score a conductivity of a heated conductive object. The convection scoring module 36 is configured to score an environmental status (e.g., thermal convection) of an environment of the current-completed inspection.

5. A threshold calculation module 37, is configured to calculate the score threshold, such as a heating score threshold, a conduction score threshold, and a convection score threshold. The above score thresholds are determination references used to determine qualities of the heating status, the environmental status, the conductivity, and/or other properties.

6. An initialization module 38, is configured to execute an initialization configuration before the inspection procedure begins.

The above-mentioned modules 30-38 are connected to each other (such as by an electrical connection or an information link), and any one of the modules 30-38 may be a hardware module (such as an electronic a circuit module, an integrated circuit module, an SoC, etc.), a software module (such as firmware, an operating system, or an application program) or a combination of the hardware module and the software module, this specific example is not intended to limit the scope of the present disclosure.

Please be noted that if each of the above-mentioned modules 30-38 is the software module, such as the application program, the storage device 103 may include a non-transitory computer-readable media. The non-transitory computer-readable media stores a computer program. The computer program records a computer-readable code. When the processor 100 executes the computer-readable code, the control functions corresponding to above-mentioned modules 30-38 may be achieved.

Please refer to FIG. 2, in one of the exemplary embodiments, the control module 10 is only used to control a heating action of the infrared heating module 11 and a temperature measurement action of the infrared temperature measurement module 12, but not used to execute the scoring process.

More specifically, the modules 33-38 may be built on a computing platform 20, such as a cloud computation service platform or a remote server. The control module 10 may connect to the computing platform 20 through the communication device 101 to retrieve an initialization-related data (such as the score thresholds, the stop condition described later etc.), and upload a collected data (such as a temperature data and a slope data) to the computing platform 20, and the computing platform 20 is able to process the uploaded data and calculate each score correspondingly. Thus, the high-loading computing is executed by the computing platform 20, so the control module 10 only needs a general processing ability and may be implemented by a lower-level processor.

In one of the exemplary embodiments, the infrared heating module 11 may include one or more heating component(s), such as a combination of an infrared light source and one or more lens. FIG. 2 takes one heating component 110 for an example. Each heating component 110 may heat a single point or a small area of the heat pipe, a size of the area being heated depends on an infrared projection area of the heating component 110. Thus, when a plurality of heating components 110 are provided, multiple points or a large area of the heat pipe 22 may be heated simultaneously, and the heating power may be raised.

In one of the exemplary embodiments, the infrared temperature measurement module 12 may include one or more measurement component(s). FIG. 2 takes two measurement components 120-121 for an example. Each measurement component 120, 121 may be an infrared thermometer which may execute a temperature measurement to a single point of the heat pipe 22. Thus, when a plurality of measurement components 120-121 are provided, temperatures of multiple points on the heat pipe 22 may be measured simultaneously, and more temperature measurement data may be retrieved.

In one of the exemplary embodiments, the contactless inspection apparatus 1 further includes a fixed fixture 21.

The fixed fixture 21 is used to fix the heat pipe 22 to be inspected, such that the infrared heating module 11 may continuously heat same position of the heat pipe 22. Moreover, the infrared temperature measurement module 12 may continuously measure the temperature of the same position of the heat pipe 22.

Figure 8:
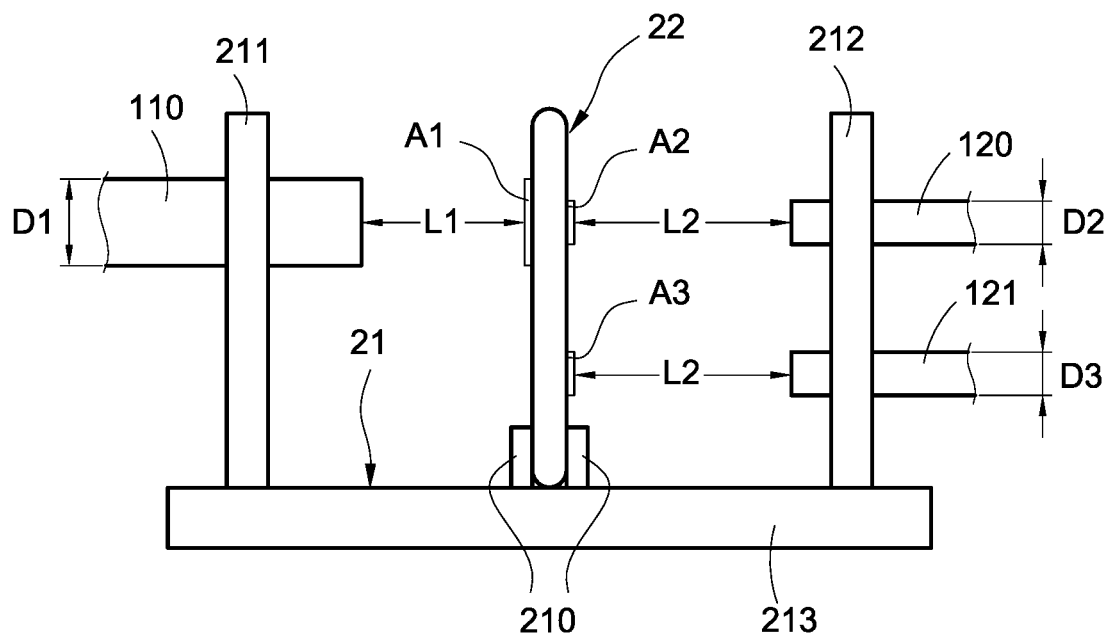
FIG. 8 is a schematic view showing a setup of the contactless inspection environment according to an embodiment of the present disclosure.

Please refer to FIG. 8, which is a schematic view showing a setup of the contactless inspection environment according to an embodiment of the present disclosure. As shown in the Fig., the fixed fixture 21 may include a first installed structure 211, a second installed structure 212, a third installed structure 210 arranged between the first installed structure 211 and the second installed structure 212, and a foundation 213.

To inspect the heat pipe 22 to be inspected, the heating component 110 of the infrared heating module 11 is fixedly installed on the first installed structure 211, the measurement components 120-121 of the infrared temperature measurement module 12 are fixedly installed on the second installed structure 212, and the heat pipe 22 to be inspected is fixedly disposed on the third installed structure 210.

Thus, the heating component 110 may heat a heating position A1 on one surface of the heat pipe 22, and the measurement components 120-121 may measure the temperatures of measurement positions A2, A3 on another surface (the different surface) of the heat pipe 22.

In one of the exemplary embodiments, one of the measurement positions A2 is set directly behind the heating position A1 for the infrared temperature measurement module 12 to measure the temperature of the position close to the heating position A1. Moreover, at least one measurement position A3 is set away from a position directly behind the heating position A1 for the infrared temperature measurement module 12 to measure the temperature of the position being away from the heating position A1. With the above configuration, the present disclosure is able to retrieve a temperature difference between the measurement positions A2 and A3, and a conductivity of the heat pipe 22 may be valued based on the temperature difference (described later).

In one of the exemplary embodiments, the heating position A1 and the measurement positions A2 and A3 of the heat pipe 22 are coated with a dark color radiant paint, the dark color radiant paint may improve the heat pipe 22 in absorbing radiant thermal energy and improve the heating efficiency of the heat pipe 22, and improve the success rate and accuracy of temperature measurement.

In one of the exemplary embodiments, an area of the dark color radiant paint coated on the heating position A1 is greater than a laser (infrared) irradiation area D1 of the heating component 110, so a heating infrared light may completely irradiate on the dark color radiant paint. Moreover, each area of the dark color radiant paint coated on each of the measurement positions A2, A3 is greater than each of measurement areas D2, D3 of the measurement components 120, 121, so a measurement infrared light may completely irradiate on the dark color radiant paint.

In one of the exemplary embodiments, a distance L1 (referred to a first distance in the embodiment) between the heating component 110 and the heat pipe 22 is adjusted based on a focal length of the lens of the heating component 110, and the heating infrared light may be effectively focused on the heating position A1. For example, the first distance may be equal to the focal length of the lens.

Besides, a distance L2 (referred to a second distance in the embodiment) between any of the measurement components 120, 121 and the heat pipe 22 is adjusted based on a focal length of the lens of any of the measurement components 120 and 121, and the temperature-measuring infrared light may be effectively focused on each of the measurement positions A2 and A3. For example, any of the second distance may be equal to the focal length of the lens.

In one of the exemplary embodiments, the distance between the measurement component 120 and the heat pipe 22 is equal to the second distance between the measurement component 121 and the heat pipe 22. For example, they are equal to the distance L2. Thus, an error of temperature measurement caused by the different measurement distances can be prevented.

Figure 9:
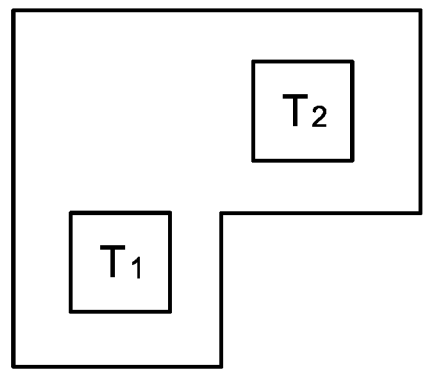
FIG. 9 is a schematic view showing one surface appearance of a heat pipe according to an embodiment of the present disclosure.
Figure 10:
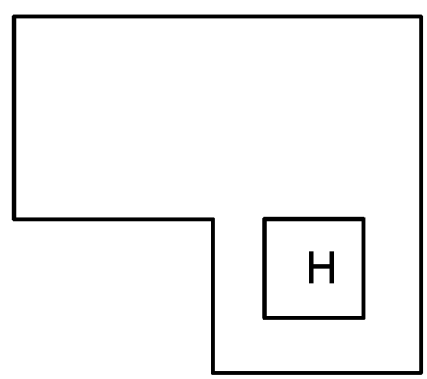
FIG. 10 is a schematic view showing another surface appearance of the heat pipe of FIG. 9.

Please refer to FIGS. 9 and 10 simultaneously, FIG. 9 is a schematic view showing one surface appearance of a heat pipe according to an embodiment of the present disclosure, FIG. 10 is a schematic view showing another surface appearance of the heat pipe of FIG. 9.

The disclosure is suitable for the thermal conduction inspection of Vapor Chamber (VC). More specific, the present disclosure is able to heat a heating position H shown in FIG. 10 on one surface of the vapor chamber, and measure temperatures of two measurement positions T1, T2 on another surface of the vapor chamber, wherein the measurement position T1 is directly behind the heating position H.

Besides, when heating the heating position H of the vapor chamber, a liquid under the surface of the heating position H absorbs a thermal energy, and is transformed into a steam to moves to other positions (such as the measurement position T2) with less pressure, and the steam is condensed into the liquid by contacting the surface of the other positions (such as the measurement position T2) and release the thermal energy, and the liquid flows back to the heating position H. Thus, a thermal cycle is implemented, and the heat dissipation function is achieved.

Figure 4:
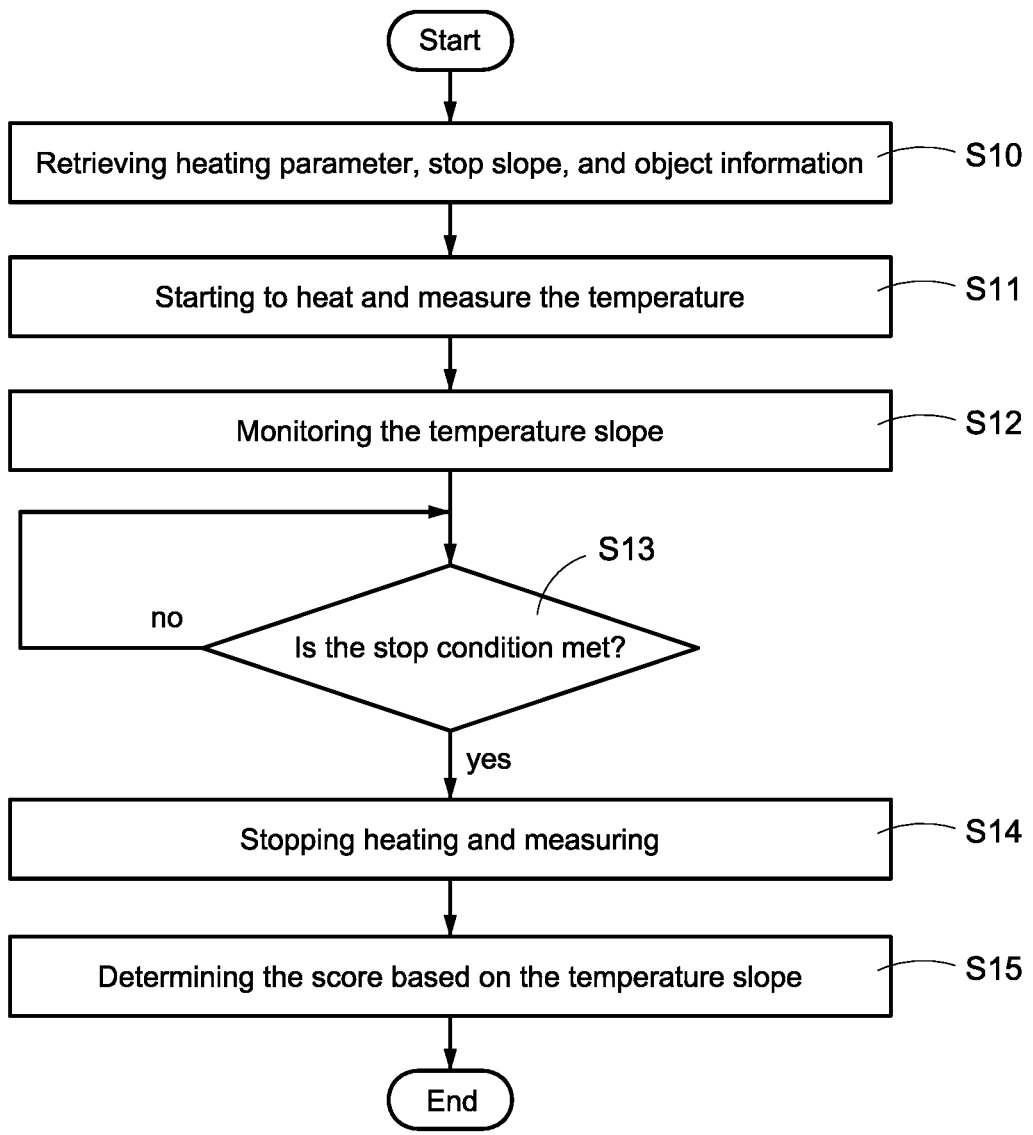
FIG. 4 is a flowchart of the contactless inspection method according to an embodiment of the present disclosure.

Please refer to FIG. 4, which is a flowchart of the contactless inspection method according to an embodiment of the present disclosure.

Step S10: the processor 100 retrieves the heating parameter, a stop slope, and the object information of the heat pipe 22 to be inspected.

The aforementioned heating parameter is used to control the heating power outputted by the infrared heating module 11. The stop slope is used to determine whether the inspection procedure should be terminated. The object information may include a mass, an area, a specific heat capacity, a target temperature, etc., but this specific example is not intended to limit the scope of the present disclosure.

The aforementioned heating parameter, the stop slope, and the object information may be configured in advance and stored in the storage device 103, or inputted by the user manually, but this specific example is not intended to limit the scope of the present disclosure.

In one of the exemplary embodiments, the processor 100 may retrieve an infrared heating parameter of the infrared heating module 11 (such as a heating ability of the infrared heating module 11) and an object thermal parameter applied to heat the heat pipe 22 (such as a temperature variation ability of the heat pipe 22), and calculate the stop slope based on the infrared heating parameter and the object thermal parameter.

Step S11: the processor 100 uses the heating control module 30 to control the infrared heating module 11 to heat the heat pipe 22 based on the heating parameter, and uses the measurement control module 31 to control the infrared temperature measurement module 12 to continuously measure the temperatures of the heat pipe 22 to obtain the measurement temperature data of the measurement positions.

In one of the exemplary embodiments, the processor 100 may control a plurality of the measurement components 120-121 of the infrared temperature measurement module 12 to simultaneously measure a plurality of measurement positions A2-A3 of the heat pipe 22 to obtain a plurality of measurement temperature data of the measurement positions A2-A3.

Step S12: during the heating procedure, the processor 100 uses the measurement control module 31 to retrieve the measurement temperature data of the infrared temperature measurement module 12, and monitor a temperature slope of the measurement temperature data in real-time. For example, the processor 100 calculates a temperature variation between two continuous time points (such as time points at 0.5 seconds, 1 second, 5 seconds, 10 seconds, etc.), and calculates the temperature slope that corresponds to the temperature variation.

Step S13: the processor 100 uses the stopping monitoring module 32 to detect whether the default stop condition is met.

In one of the exemplary embodiments, the above stop condition may include a condition of the temperature slope being converged to the stop slope. For example, the temperature slope gradually decreases to the stop slope. Namely, the inspection procedure is stopped when the stopping monitoring module 32 detects that the real-time temperature slope converges to the stop slope.

In one of the exemplary embodiments, the stop condition includes a condition of an accumulated heating time (such as a heating duration) reaching an upper limit of an inspection time (such as 1 minute, 5 minutes, 30 minutes, etc.). Namely, the inspection procedure is stopped when the stopping monitoring module 32 detects a time out of the accumulated heating time.

In one of the exemplary embodiments, the stop condition includes at least one condition of both of the above stop conditions. Namely, the inspection procedure is stopped when either the temperature slope converges to the stop slope or a time out of the accumulated heating time.

Before the stop condition is met, the step S13 is repeatedly performed to continuously heat, measure the temperature, monitor the temperature slope, and detect whether the stop condition is met.

When the stop condition is met, the step S14 is performed: the processor 100 uses the heating control module 30 to control the infrared heating module 11 to stop heating and uses the measurement control module 31 to control the infrared temperature measurement module 12 to stop measuring.

Please be noted that the step S14 may be optionally omitted. In one of the exemplary embodiments, the present disclosure may continuously execute heating and measuring after the stop condition is met, and directly perform the step S15 to score the heat pipe 22 based on the data measured before the stop condition is met.

Step S15: the processor 100 uses the scoring module 33 to execute a scoring process based on the temperature slope of the measurement temperature data to determine a score of the heat pipe 22 to be inspected. The score may include a value, the level of the value indicates a quality of properties of the heat pipe 22 being inspected, such as conduction status, convection status and/or heating status. In one embodiment, a greater value represents a better quality. In another embodiment, a lower value represents a better quality.

In one of the exemplary embodiments, the scoring module 33 may further compare the score of the heat pipe 22 being inspected with a score threshold configured in advance, determine the heat pipe 22 to be a non-defective one or an available one when the score of the heat pipe 22 being inspected is greater (better) than the score threshold, and determine the heat pipe 22 being inspected to be a defective one or an unavailable one when the score of the heat pipe 22 being inspected is less (worser) than the score threshold. The above-mentioned score may be configured as either a greater value of the score representing a better quality, or a lower value of the score representing a better quality, but this specific example is not intended to limit the scope of the present disclosure.

In one of the exemplary embodiments, the scoring module 33 may compare one or more temperature slope(s) of the measurement temperature data with one or more default available produce slope(s), and calculate the score based on a conformity degree of these slopes.

In one of the exemplary embodiments, if a time out occurs to the accumulated heating time, it means that the conductivity of the heat pipe 22 to be inspected is too bad to be obtained an obvious conduction characteristic during a designated time duration. Thus, the scoring module 33 may directly determine a worse score (such as a score of a defective product level) o the heat pipe 22 or determine the heat pipe 22 as a defective product.

Thus, the present disclosure may inspect the conductivity of the heat pipe 22 through a contactless inspection manner.

Figure 5:
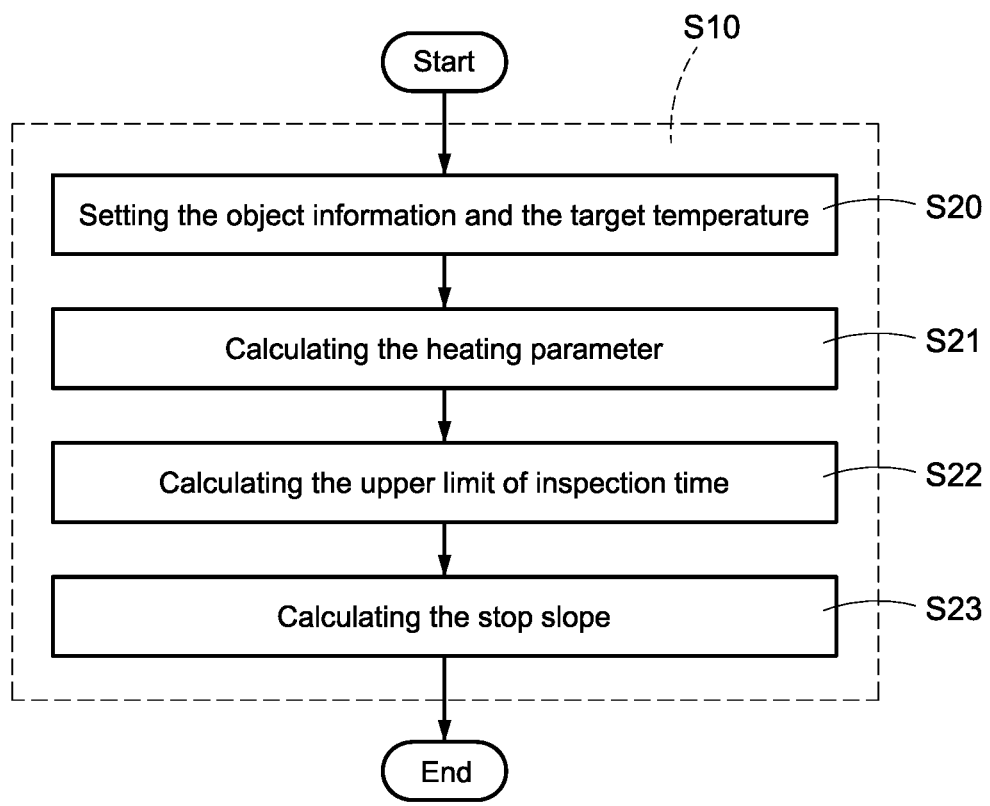
FIG. 5 is a partial flowchart of the contactless inspection method according to an embodiment of the present disclosure.

Please refer to FIG. 4 and FIG. 5 simultaneously, FIG. 5 is a partial flowchart of the contactless inspection method according to an embodiment of the present disclosure. In comparison with the embodiment shown in FIG. 4, the step S10 of the embodiment shown in FIG. 5 includes specific initialization steps S20-S23, wherein the execution sequence of the steps S21-S23 may be changed arbitrarily according to user's demand, otherwise the steps S21-S23 may be executed at the same time.

Step S20: the processor 100 uses the initialization module 38 to set the object information and the target temperature.

In one of the exemplary embodiments, the user may operate the human-machine interface 102 to directly input the object information (such as mass, size, material, specific heat capacity, single-surface area or full area, etc.) of the heat pipe 22, and input the target temperature (such as 60, 70 or 80 degrees Celsius, etc.).

In one of the exemplary embodiments, the initialization module 38 may load a plurality of object information and a plurality of target temperatures stored in the storage device 102 in advance, and display the loaded object information and the loaded target temperatures on the human-machine interface 102 for the user to select therefrom.

Step S21: the processor 100 uses the initialization module 38 to calculate the heating parameter of the infrared heating module 11.

In one of the exemplary embodiments, the heating parameter includes an input heating voltage of the infrared heating module 11. A heating power outputted by the infrared heating module 11 may be adjusted by adjusting the input heating voltage.

More specifically, the initialization module 38 may retrieve the object thermal parameter of the heat pipe 22 based on the mass and a specific heat capacity of the heat pipe 22, and calculate the input heating voltage to be the heating parameter based on the object thermal parameter and the infrared heating parameter (such as an infrared heater power, an infrared emissivity rate and/or a radiation attenuation rate) of the infrared heating module 11.

In one of the exemplary embodiments, the object thermal parameter $P_{VC}$ of the heat pipe 22 may be obtained by performing a calculation in accordance with all or part of factors such as the infrared heater power $P_{IR}$, the infrared emissivity rate $E_{IR}$, and the radiation attenuation rate σ, but this specific example is not intended to limit the scope of the present disclosure.

In one of the exemplary embodiments, the object thermal parameter $P_{VC}$ of the heat pipe 22 may be obtained by performing a calculation in accordance with all or part of factors such as the mass m of the heat pipe 22, the specific heat capacity Cρ of the heat pipe 22, and the measurement temperature T1 of the heat pipe 22, but this specific example is not intended to limit the scope of the present disclosure.

Thus, the present disclosure may obtain the infrared emissivity rate $E_{IR}$ via the above relationship.

In one of the exemplary embodiments, the initialization module 38 may calculate the infrared heater power $P_{IR}$ by following equations 1 and 2.

$$P_{VC} = P_{IR} \times E_{IR} \times \sigma \qquad \text{(Equations 1)}$$

$$P_{VC} = mC\rho \frac{dT1}{dt} \qquad \text{(Equations 2)}$$

wherein $P_{VC}$ is the object thermal parameter of the heat pipe 22 (i.e, a thermal conduction object); $P_{IR}$ is the infrared heater power; $E_{IR}$ is the infrared emissivity rate; a is the radiation attenuation rate; m is the mass of the heat pipe 22; Cρ is the specific heat capacity of the heat pipe; T1 is the measurement temperature of the heat pipe 22.

Figure 11:
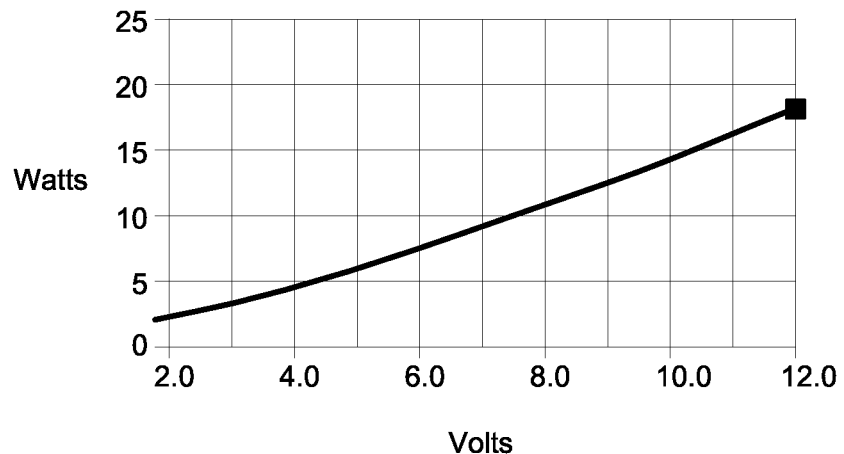
FIG. 11 is a curve chart of a relationship between the heating power variation and the voltage variation according to an embodiment of the present disclosure.

Please refer to FIG. 11, FIG. 11 is a curve chart of a relationship between the heating power variation and the voltage variation according to an embodiment of the present disclosure. After obtaining the infrared heater power, the initialization module 38 may calculate the corresponding input heating voltage to be the heating parameter based on the specification (as shown in FIG. 11) of the infrared heating module 11. For example, the input heating voltage may be calculated as 7.5 V when the infrared heater power is 10 W.

Please refer back to FIG. 5.

Step S22: the processor 100 uses the initialization module 38 to calculate the upper limit of the inspection time. The above-mentioned upper limit of the inspection time may be used to a part of the stop condition.

More specifically, the initialization module 38 obtains the pre-configured target temperature, calculates a temperature difference between the target temperature and an environment temperature, and calculates the upper limit of the inspection time based on the temperature difference, the object information of the heat pipe 22, the object thermal parameter of the heat pipe 22, and an environmental convection parameter.

In one of the exemplary embodiments, the upper limit $T_{max}$ of the inspection time may be calculated based on all or part of the mass m of the heat pipe 22, the specific heat capacity Cρ of the heat pipe 22, the target temperature SV, the environmental temperature $T_{env}$, the object thermal parameter $P_{vc}$ applied to heat the heat pipe 22, one surface area $A_{vc}$ of the heat pipe 22, an environmental convection parameter H and other factors, but this specific example is not intended to limit the scope of the present disclosure.

In one of the exemplary embodiments, the initialization module 38 may calculate the upper limit of the inspection time by following equation 3.

$$T_{max} = \frac{mC\rho(SV - T_{env})}{P_{VC} - 2A_{VC}H(SV - T_{env})} \quad \text{(Equation 3)}$$

Wherein $T_{max}$ is the upper limit of the inspection time; m is the mass of the heat pipe 22; C$\rho$ is the specific heat capacity of the heat pipe 22; SV is the target temperature; $T_{env}$ is the environmental temperature; $P_{vc}$ is the object thermal parameter applied to heat the heat pipe 22; $A_{vc}$ is one surface area of the heat pipe 22; H is the environmental convection parameter (generally between $$20\text{-}40\left(\frac{W}{m^2K}\right)).$$

Step S23: the processor 100 uses the initialization module 38 to calculate the stop slope. The above-mentioned stop slope is used as a part of the stop condition.

Figure 12:
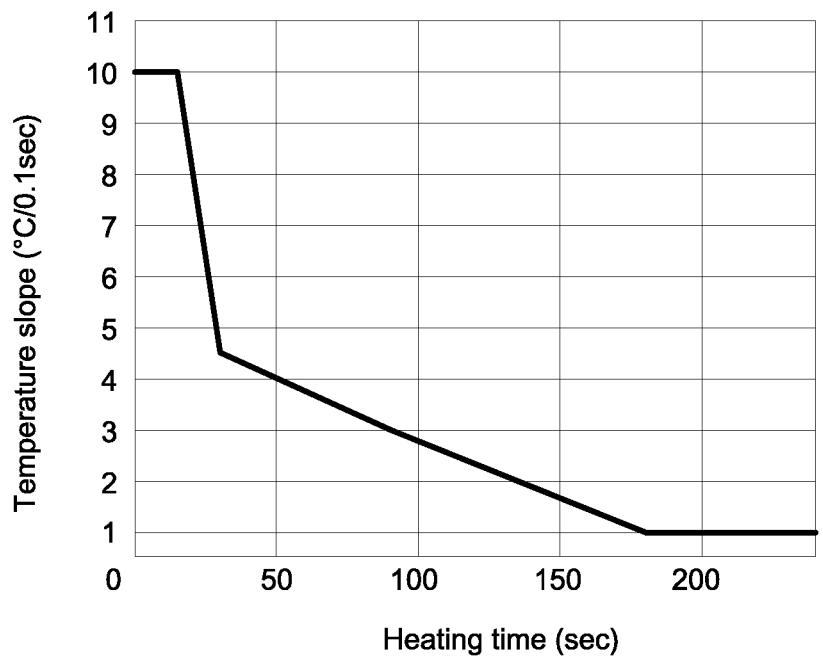
FIG. 12 is a curve chart of a variation relationship between the temperature slope variation and time according to an embodiment of the present disclosure.

Please refer to FIG. 12. FIG. 12 is a curve chart of a variation relationship between the temperature slope variation and time according to an embodiment of the present disclosure.

More specifically, the initialization module 38 may calculate and simulate a time-temperature simulation variation of the heat pipe 22 as shown in FIG. 12 based on the temperature difference between the target temperature and the environmental temperature, the object information and the object thermal parameter of the heat pipe 22 to be inspected, and the environmental convection parameter, and set the stop slope based on the time-temperature simulation variation and the upper limit of the inspection time. For example, a slope with a value of 4 corresponding to a time point at 50th second or a slope with a value of 2.8 corresponding to another time point at 100th second may be selected as the stop slope.

In one of the exemplary embodiments, the stop slope is greater than 1. Namely, the inspection procedure is terminated before the temperature of the heat pipe 22 becomes stable (i.e., before a thermal equilibrium is reached).

Thus, the present disclosure may complete the initialize settings.

Figure 6:
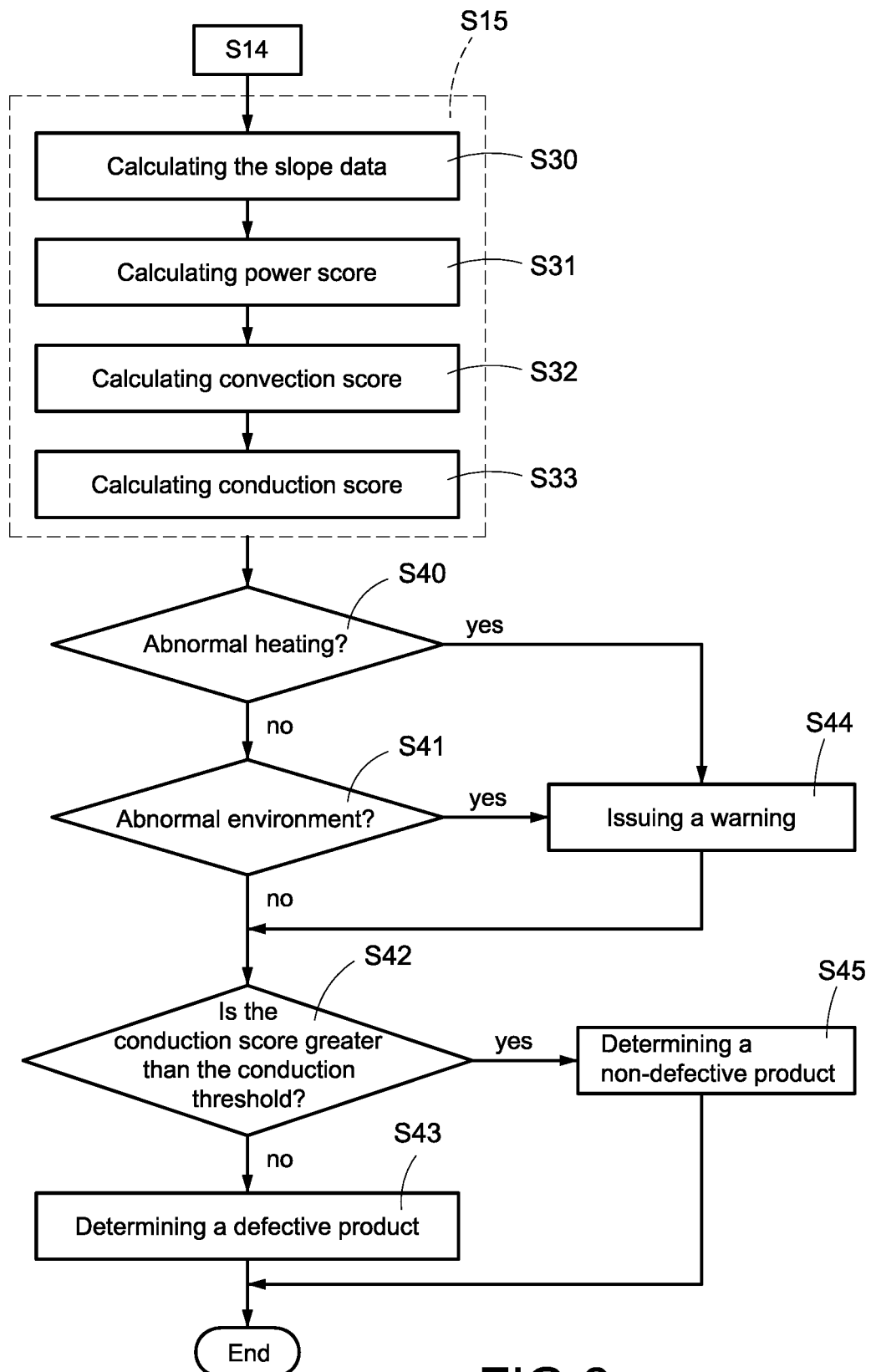
FIG. 6 is a partial flowchart of the contactless inspection method according to an embodiment of the present disclosure.
Figure 7:
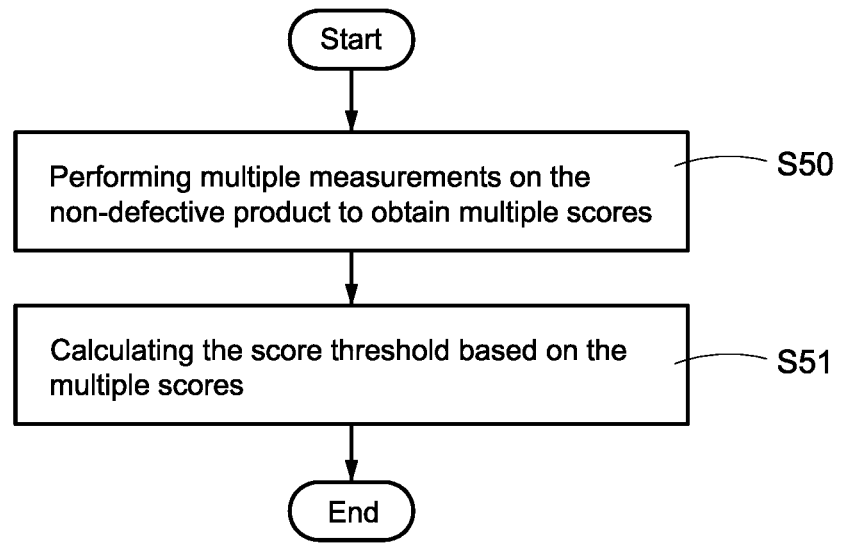
FIG. 7 is a partial flowchart of the contactless inspection method according to an embodiment of the present disclosure.

Please refer to FIG. 4 and FIG. 6 simultaneously, FIG. 6 is a partial flowchart of the contactless inspection method according to an embodiment of the present disclosure. In comparison with the embodiment shown in FIG. 4, the step S15 of the embodiment shown in FIG. 6 includes specific initialization steps S30-S33, wherein the execution sequence of the steps S31-S33 may be changed arbitrarily according to user's demand, otherwise the steps S31-S33 may be executed at the same time.

Step S30: the processor 100 uses the scoring module 33 to calculate the slope data of the obtained measurement temperature data, the above-mentioned slope data includes a plurality of slopes, each of the slopes respectively corresponds to different temperature various level of the heat pipe 22 in different time interval during the heating procedure.

Step S31: the processor 100 uses the heating scoring module 34 to calculate a heating score of the heating status of the infrared heating module 11 in the current-completed inspection based on the plurality of slopes of the slope data.

In one of the exemplary embodiments, the heating scoring module 34 may select all or part of the slopes of the slope data (such as selecting a plurality of slopes each corresponding to a designated time interval) and calculate an average of the selected slopes to obtain the aforementioned heating score.

In one of the exemplary embodiments, as shown in FIG. 8, when simultaneously measuring the temperatures of the multiple measurement positions of the heat pipe 22, the heating scoring module 34 may select the temperature measurement data of the measurement position A2 directly behind the heating position A1 (i.e., closest to the heating position A1) to calculate the aforementioned heating score. Therefore, the calculated heating score may be closer to the heating performance of the infrared heating module 11.

Step S32: the processor 100 uses the convection scoring module 36 to calculate a convection score of an inspection environment.

Step S33: the processor 100 uses the scoring module 35 to calculate a conduction score of the heat pipe 22.

In one of the exemplary embodiments, as shown in FIG. 8, the plurality of measurement positions A2, A3 are measured to obtain a plurality of temperature measurement data of the measurement positions A2, A3. The temperature measurement data of the measurement positions A2, A3 may be, for example, two sets of temperature curve of the measurement positions A2 and A3 recorded from the heating procedure is started to the stop condition is met, or two sets of temperature curve of the measurement positions A2, A3 recorded from a designated period of the heating procedure (such as 3 seconds after the heating procedure is started) to the stop condition is met. When the plurality of temperature measurement data is obtained, the processor 100 uses the convection scoring module 36 and the conduction scoring module 35 to firstly calculate a temperature difference data among the multiple measurement temperature data, and calculate the aforementioned convection score and conduction score based on the slope data and the temperature difference data. The temperature difference data may be calculated, for example, by subtracting the two measurement temperature data of the measurement positions A2 and A3.

In one of the exemplary embodiments, the convection scoring module 36 and the conduction scoring module 35 are configured to firstly divide the slope data by the temperature difference data to obtain a characteristic data (such as a convection characteristic data or a conduction characteristic data), and then calculate a regression of the characteristic data (such as using the least square method) to obtain an exponential decay formula (for example, fitting the characteristic data to a set of curves to obtain the exponential decay formula of this curve), and determine the above-mentioned convection score and the above-mentioned conduction score based on the exponential decay formula.

Furthermore, as shown in FIG. 8, when there are multiple measurement positions A2, A3, the above calculation is configured to select the slope data of the temperature measurement data of the measurement position A2 directly behind (or being closest to) the heating position A1, and obtain the characteristic data by dividing the slope data by the temperature difference data, but this specific example is not intended to limit the scope of the present disclosed example. In another embodiment, the temperature measurement data of the measurement position A3 may be selected for the calculation.

Please be noted that the aforementioned exponential decay formula includes a base part and an exponent part, the present disclosure determines the conduction score based on the base part, and determines the convection score based on the exponent part.

Thus, the present disclosure may determine different types of scores.

In the embodiment shown in FIG. 6, the method further includes steps S40-S45 used to determine an inspection result based on the score, wherein the execution sequence of the steps S40-S42 may be changed arbitrarily according to user' demand, otherwise the steps S40-S42 may be executed at the same time.

Step S40: the processor 100 uses the heating scoring module 34 to determine whether the heating score is less (worser) than the default heating score threshold.

When the heating score is less (worser) than the default heating score threshold, the step S44 is performed: the processor 100 issues an alarm through the human-machine interface 102 to remind the user that a heating status is bad.

When the heating score is greater (better) than the default heating score threshold, the heating status is determined to be good and the step S41 is performed: the processor 100 uses the convection scoring module 36 to determine whether the convection score is less (worser) than a convection score threshold.

When the convection score is less (worser) than the convection score threshold, the step S44 is performed: the processor 100 issues an alarm through the human-machine interface 102 to remind the user that an environmental status (especially, the convective status) is bad.

After the step S44, the processor 100 may then perform the step S42 to further determine whether the conduction score is qualified, but this specific example is not intended to limit the scope of the present disclosure.

In another of the exemplary embodiments, when the heating status or the environmental status is determined to be bad, conduction score may not correctly react the conductivity of the heat pipe 22. Thus, the processor 100 may directly terminate the inspection procedure after the step S44 without scoring the heat pipe 22 to be a non-defective one or a defective one.

The environment status is determined to be good when the convection score is greater (better) than the default convection score threshold, and the step S42 is performed: the processor 100 uses the conduction scoring module 35 to determine whether the score (i.e., the conduction score) of the heat pipe 22 is greater (better) than a score threshold (i.e., the conduction score threshold).

The conductivity is determined to be bad when the conduction score is less (worser) than the conduction score threshold, and the step S43 is performed: the processor 100 uses the conduction scoring module 35 to determine the heat pipe 22 to be a defective product, and issues a notification of the defective product through the human-machine interface 102.

The conductivity is determined to be good when the conduction score is greater (better) than the conduction score threshold, and the step S45 is performed: the processor 100 uses the conduction scoring module 35 to determine the heat pipe 22 to be a non-defective product (i.e., an available product), and issues a notification of the available product through the human-machine interface 102.

The present disclosure may effectively inspect the conductivity of the heat pipe 22, and automatically generate the inspection result.

Besides, the present disclosure may simultaneously inspect the heating status and the environmental status to prevent a misjudgment of the inspection result caused by a bad heating status being bad or a bad environment status.

Please refer to FIGS. 4-7, FIG. 7 is a partial flowchart of the contactless inspection method according to an embodiment of the present disclosure. In comparison with the embodiment shown in FIG. 4, the embodiment shown in FIG. 7 further provides a function of calculating the score threshold, where the score threshold corresponding to an available product may be obtained through inspecting multiple available products with same type. The method of this embodiment further includes following steps.

Step S50: the user may use the contactless inspection apparatus 1 to execute the inspection procedure on a non-defective heat pipe having same type with the heat pipe 22 to be inspected for many times. For example, the steps S10-S15 may be performed for at least two times. After the multiple inspection procedures are performed, a plurality of non-defective (available) product scores may be obtained through the steps S30-S33. The plurality of non-defective product scores may be, for example, a plurality of heating non-defective product scores, a plurality of convection non-defective product scores, and a plurality of conduction non-defective product scores.

Step S51: the processor 100 uses the threshold calculation module 37 to retrieve the above non-defective product scores, and set the score threshold based on the non-defective product scores.

In one of the exemplary embodiments, the threshold calculation module 37 is configured to calculate the heating score threshold based on the heating non-defective product scores, calculate the convection score threshold based on the convection non-defective product scores, and calculate the conduction score threshold based on the conduction non-defective product scores.

In one of the exemplary embodiments, the threshold calculation module 37 is configured to calculate an average of the non-defective product scores, such as a weighted average or a general average, to be the score threshold, and the average may be moderately adjusted.

For example, if a greater score represents a better quality, the score threshold may be configured as a value to 80% or 90% of the average.

In another example, if a lower score represents a better quality, the score threshold may be configured as a value to 110% or 120% of the average.

Thus, the present disclosure may effectively set many types of score thresholds, and be beneficial to judge the availability of the inspection results.

While this disclosure has been described by means of specific embodiments, numerous modifications and variations could be made thereto by those skilled in the art without departing from the scope and spirit of this disclosure set forth in the claims.

What is claimed is:

1. A contactless inspection method of a heat pipe to be inspected, the method applied to a contactless inspection apparatus comprising an infrared heating module and an infrared temperature measurement module, the method comprising:
   a) retrieving a heating parameter and an object information of the heat pipe to be inspected;
   b) calculating a stop slope based on an infrared heating parameter of the infrared heating module and an object thermal parameter to heat the heat pipe to be inspected;
   c) controlling the infrared heating module to heat the heat pipe to be inspected based on the heating parameter, and controlling the infrared temperature measurement module to measure a measurement temperature data of the heat pipe to be inspected;
d) monitoring a temperature slope of the measurement temperature data during a heating procedure;
e) executing a scoring process based on the temperature slope to determine a score of the heat pipe to be inspected when a stop condition is met, wherein the stop condition comprises a condition of the temperature slope being converged to the stop slope; and
f) determining the heat pipe to be inspected to be a non-defective one when the score of the heat pipe to be inspected is greater than a score threshold, and determining the heat pipe to be inspected to be a defective one when the score of the heat pipe is less than the score threshold.

2. The method according to claim 1, wherein the step a) comprises:
g1) retrieving the object thermal parameter based on a mass and a specific heat capacity of the heat pipe to be inspected; and
g2) retrieving an input heating voltage of the infrared heating module as the heating parameter based on the object thermal parameter and the infrared heating parameter.

3. The method according to claim 1, wherein the stop condition comprises a condition of an accumulated heating time reaching an upper limit of an inspection time; and
wherein the method further comprises following the steps performed before the step c):
h1) setting a target temperature based on a user operation; and
h2) retrieving the upper limit of the inspection time based on a temperature difference between the target temperature and an environmental temperature, the object information, the object thermal parameter and an environmental convection parameter.

4. The method according to claim 1, wherein the step b) comprises:
i1) simulating and calculating a time-temperature simulation variation of the heat pipe to be inspected based on a temperature difference between a target temperature and an environmental temperature, the object information, the object thermal parameter, the infrared heating parameter and an environmental convection parameter; and
i2) setting the stop slope based on the time-temperature simulation variation and an upper limit of an inspection time, wherein the stop slope is greater than 1.

5. The method according to claim 1, further comprising following the steps performed before the step e):
j1) controlling the infrared heating module to heat a non-defective heat pipe that is the same type as the heat pipe to be inspected based on the heating parameter, and controlling the infrared temperature measurement module to measure a measurement temperature data of the non-defective heat pipe;
j2) determining a non-defective product score of the non-defective heat pipe based on the measurement temperature data of the non-defective heat pipe;
j3) repeatedly performing the steps j1) and j2) at least two times to obtain multiple non-defective product scores; and
j4) setting the score threshold based on the multiple non-defective product scores.

6. The method according to claim 1, wherein the scoring process comprises:
k1) calculating a slope data of the measurement temperature data; and
k2) calculating a heating score based on a plurality of slopes of the slope data, wherein the plurality of slopes respectively correspond to different time intervals in the heating procedure; and
wherein the step e) comprises a step II): issuing an alarm to remind that a heating status is defective when the heating score is less than a heating score threshold.

7. The method according to claim 1, wherein the step c) comprises controlling the infrared temperature measurement module to measure the heat pipe to be inspected at a plurality of measurement positions to obtain multiple measurement temperature data of the measurement positions;
wherein, the scoring process comprises:
m1) calculating a slope data of the measurement temperature data;
m2) calculating a temperature difference data among the multiple measurement temperature data; and
m3) calculating a convection score and a conduction score based on the slope data and the temperature difference data;
wherein the step e) comprises:
n1) issuing an alarm to remind that an environmental status is defective when the convection score is less than a convection score threshold;
wherein the step f) comprises:
n2) determining the heat pipe to be inspected as the non-defective one when the conduction score is greater than a conduction score threshold; and
n3) determining the heat pipe to be inspected as the defective one when the conduction score is less than the conduction score threshold.

8. The method according to claim 7, wherein the step m3) comprises dividing the slope data by the temperature difference data to obtain a characteristic data, calculating a regression on the characteristic data to obtain an exponential decay formula, and determining the convection score and the conduction score based on the exponential decay formula.

9. The method according to claim 1, wherein the step c) comprises controlling the infrared heating module to heat a heating position on one surface of the heat pipe to be inspected, and controlling the infrared temperature measurement module to measure another surface of the heat pipe to be inspected at a plurality of measurement positions to obtain multiple measurement temperature data of the measurement positions; and
wherein the heating position is directly at a rear of one of the measurement positions, the heating position and the measurement positions are coated with a dark color radiant paint, an area of the dark color radiant paint coated on the heating position is greater than a laser irradiation area of the infrared heating module, and an area of the dark color radiant paint coated on each measurement position is greater than a measurement area of the infrared temperature measurement module.

10. The method according to claim 9, wherein the heat pipe to be inspected is a vapor chamber, the step c) comprises heating the heating position of the heat pipe to be inspected to form a thermal cycle such that a liquid under a surface of the heating position absorbs a thermal energy and is transformed into a steam to move to other positions with less pressure, the steam is condensed into the liquid by contacting surfaces of the other positions to release the thermal energy, and the liquid flows back to the heating position.

11. A contactless inspection apparatus of a heat pipe to be inspected, comprising:
an infrared heating module configured to heat the heat pipe to be inspected based on a heating parameter;
an infrared temperature measurement module configured to measure a measurement temperature data of the heat pipe to be inspected; and
a control module, which is electrically connected to the infrared heating module and the infrared temperature measurement module, configured to retrieve the heating parameter and an object information of the heat pipe to be inspected; calculate a stop slope based on an infrared heating parameter of the infrared heating module and an object thermal parameter to heat the heat pipe to be inspected; monitor a temperature slope of the measurement temperature data during a heating procedure; determine a score of the heat pipe to be inspected based on the temperature slope when a stop condition is met; determine the heat pipe to be a non-defective one when the score of the heat pipe is greater than a score threshold; and determine the heat pipe to be a defective one when the score of the heat pipe is less than the score threshold; wherein the stop condition comprises a condition of the temperature slope being converged to the stop slope.

12. The contactless inspection apparatus according to claim 11, wherein the control module comprises:
an initialization module configured to retrieve the object thermal parameter based on a mass and a specific heat capacity of the heat pipe, and retrieve an input heating voltage of the infrared heating module as the heating parameter based on the object thermal parameter and the infrared heating parameter; simulate and calculate a time-temperature simulation variation of the heat pipe to be inspected based on a temperature difference between a target temperature and an environmental temperature, the object information, the object thermal parameter, the infrared heating parameter and an environmental convection parameter; and set the stop slope based on the time-temperature simulation variation and an upper limit of an inspection time, wherein the stop slope is greater than 1.

13. The contactless inspection apparatus according to claim 11, wherein the stop condition comprises a condition of an accumulated heating time reaching an upper limit of an inspection time; and
wherein, the control module comprises:
an initialization module, configured to retrieve the upper limit of the inspection time based on a temperature difference between a target temperature and an environmental temperature, the object information, the object thermal parameter, and an environmental convection parameter.

14. The contactless inspection apparatus according to claim 11, wherein the control module comprises:
a heating control module configured to control the infrared heating module to heat;
a measurement control module configured to control the infrared temperature measurement module to execute a temperature measurement;
a stopping monitoring module configured to detect whether the stop condition is met;
a scoring module configured to calculate the score and compare the score with the score threshold; and a threshold calculation module configured to repeatedly execute a heating inspection on a non-defective heat pipe that is the same type as the heat pipe to be inspected at least two times to obtain multiple non-defective product scores by the heating control module, the measurement control module, the stopping monitoring module and the scoring module; and set the score threshold based on the multiple non-defective product scores.

15. The contactless inspection apparatus according to claim 11, wherein the control module comprises:
a heating scoring module configured to calculate a heating score based on a plurality of slopes of a slope data of the measurement temperature data, and issue an alarm to remind that a heating status is defective when the heating score is less than a heating score threshold, wherein the slopes respectively correspond to different time intervals in the heating procedure.

16. The contactless inspection apparatus according to claim 11, wherein the infrared temperature measurement module comprises a plurality of measurement components that measure the heat pipe to be inspected at a plurality of measurement positions to obtain the multiple measurement temperature data of the measurement positions;
wherein the control module comprises:
a conduction scoring module configured to calculate a conduction score based on the slope data of the measurement temperature data and a temperature difference data between the multiple measurement temperature data, determine the heat pipe to be the non-defective one when the conduction score is greater than a conduction score threshold, and determine the heat pipe to be the defective one when the conduction score is less than the conduction score threshold; and
a convection scoring module configured to calculate a convection score based on the slope data and the temperature difference data.

17. The contactless inspection apparatus according to claim 11, wherein the heat pipe to be inspected is a vapor chamber, the infrared heating module heats a heating position on one surface of the heat pipe to form a thermal cycle such that a liquid under a surface of the heating position absorbs a thermal energy and is transformed into a steam to move to other positions with less pressure, the steam is condensed into the liquid by contacting surfaces of the other positions to release the thermal energy, and the liquid flows back to the heating position.

18. The contactless inspection apparatus according to claim 11, further comprising a positioning fixture, the positioning fixture comprising:
a first installed structure installing the infrared heating module to make the infrared heating module heat a heating position on one surface of the heat pipe to be inspected;
a second installed structure installing the infrared temperature measurement module to make a plurality of measurement components of the infrared temperature measurement module measure another surface of the heat pipe to be inspected at a plurality of measurement positions; and
a third installed structure arranged between the first installed structure and the second installed structure to fix the heat pipe to be inspected;
wherein the infrared heating module installed on the first installed structure and the infrared temperature measurement module installed on the second installed structure respectively face to different surfaces of the heat pipe to be inspected that is fixed on the third installed structure.

19. The contactless inspection apparatus according to claim 18, wherein the heating position is located directly at a rear of one of the measurement positions, and at least one of the measurement positions is away from the rear of the heating position; and wherein the heating position and the measurement positions of the heat pipe to be inspected are coated with a dark color radiant paint, an area of the dark color radiant paint coated on the heating position is greater than a laser irradiation area of the infrared heating module, and an area of the dark color radiant paint coated on each measurement position is greater than a measurement area of the infrared temperature measurement module.

20. The contactless inspection apparatus according to claim 18, wherein a first distance between the infrared heating module installed on the first installed structure and the heat pipe to be inspected that is fixed on the third installed structure is adjustable based on a focal length of a lens of the infrared heating module; and wherein a second distance between the infrared temperature measurement module installed on the second installed structure and the heat pipe to be inspected that is fixed on the third installed structure is adjustable based on a focal length of a lens of the infrared temperature measurement module.

\* \* \* \* \*